(12) United States Patent
Benetschik et al.

(10) Patent No.: US 10,947,990 B2
(45) Date of Patent: Mar. 16, 2021

(54) RADIAL COMPRESSOR

(71) Applicant: MAN ENERGY SOLUTIONS SE, Augsburg (DE)

(72) Inventors: Hannes Benetschik, Munich (DE); Sebastian Spengler, Wehringen (DE); Matthias Strauss, Schrobenhausen (DE)

(73) Assignee: MAN Energy Solutions SE, Augsburg (DE)

(*) Notice: Subject to any disclaimer, the term of this patent is extended or adjusted under 35 U.S.C. 154(b) by 9 days.

(21) Appl. No.: 16/203,419

(22) Filed: Nov. 28, 2018

(65) Prior Publication Data
US 2019/0170156 A1 Jun. 6, 2019

(30) Foreign Application Priority Data
Dec. 1, 2017 (DE) .......................... 102017221717.0

(51) Int. Cl.
*F04D 29/42* (2006.01)
*F04D 29/68* (2006.01)
(Continued)

(52) U.S. Cl.
CPC ............ *F04D 29/4233* (2013.01); *F02C 6/12* (2013.01); *F04D 17/10* (2013.01);
(Continued)

(58) Field of Classification Search
CPC .. F04D 29/441; F04D 29/685; F04D 29/4213; F04D 29/68; F04D 29/4233;
(Continued)

(56) References Cited

U.S. PATENT DOCUMENTS 5,863,178 A * 1/1999 Scheinert ................ F01D 25/30
415/58.4
6,638,007 B2 * 10/2003 Bartholoma ........ F04D 29/4206
415/173.4
(Continued)

FOREIGN PATENT DOCUMENTS

CN 101560987 10/2009
CN 102022180 4/2011
(Continued)

OTHER PUBLICATIONS

Office Action dated Aug. 31, 2020 issued in Chinese Patent Application No. 201811454891.2.

*Primary Examiner* — Aaron R Eastman
*Assistant Examiner* — Maxime M Adjagbe
(74) *Attorney, Agent, or Firm* — Cozen O'Connor

(57) ABSTRACT

A radial compressor of an exhaust gas turbocharger, with a rotating impeller, a fixed housing; a main flow passage defined by the housing for feeding a medium to be compressed towards the impeller; a secondary flow chamber arranged radially outside the main flow passage, which is separated from the main flow passage by a contour wall and is connected to the main flow passage via a secondary flow opening; struts extending in the secondary flow chamber, via which the contour wall is connected to the housing. The struts are curved having a first connecting section of the contour wall that extends in the radial direction and a second connecting section on the housing that extends in the axial direction.

13 Claims, 2 Drawing Sheets

(51) Int. Cl.
*F02C 6/12* (2006.01)
*F04D 17/10* (2006.01)
*F04D 29/66* (2006.01)

(52) U.S. Cl.
CPC ....... *F04D 29/4213* (2013.01); *F04D 29/667* (2013.01); *F04D 29/685* (2013.01); F05D 2220/40 (2013.01); F05D 2240/90 (2013.01); F05D 2250/71 (2013.01); F05D 2260/96 (2013.01)

(58) Field of Classification Search
CPC .......... F04D 29/667; F04D 17/10; F02C 6/12; F05D 2230/53; F05D 2250/71; F05D 2260/96; F05D 2220/40
See application file for complete search history.

(56) References Cited

U.S. PATENT DOCUMENTS

| | | | |
|---|---|---|---|
| 7,694,518 B2 * | 4/2010 | Whiting | F01D 9/026 60/602 |
| 2015/0361990 A1 * | 12/2015 | Rodrigues | F04D 29/445 415/204 |

FOREIGN PATENT DOCUMENTS

| | | |
|---|---|---|
| CN | 102695881 | 9/2012 |
| CN | 203272166 U | 11/2013 |
| CN | 104321513 | 1/2015 |
| CN | 105626239 | 6/2016 |
| CN | 205559548 U | 9/2016 |
| EP | 2 194 272 | 6/2010 |
| EP | 2 194 277 | 6/2010 |

* cited by examiner

RADIAL COMPRESSOR

BACKGROUND OF THE INVENTION

1. Field of the Invention

The invention relates to a radial compressor.

2. Description of the Related Art

From EP 2 194 277 A1 a radial compressor of an exhaust gas turbocharger is known. EP 2 194 272 A1 shows a radial compressor with a rotating impeller and a fixed housing. The housing defines a main flow passage to conduct medium to be compressed in the direction of the impeller. Outside the main flow passage, a secondary flow chamber is arranged, which is separated from the main flow passage by a contour wall. According to EP 2 194 277 A1, the secondary flow chamber extends, emanating from a suction region of the main flow passage, as far as to a secondary flow opening in the region of the impeller. In the region of the impeller, the secondary flow chamber is connected to the main flow passage via the secondary flow opening. Within the secondary flow chamber, struts extend that connect the contour wall, which separates the main flow passage from the secondary flow passage, with the housing. According to EP 2 194 272 A1, these struts, seen in the meridional section, extend in the radial direction. Both a connecting section of the struts to the housing and also a connecting section of the struts to the contour wall thus extend in the radial direction.

SUMMARY OF THE INVENTION

One aspect of the invention is based on further improving the characteristic map stability and the operating behaviour of a radial compressor.

Starting out from this, the object of one invention is to create a new type of radial compressor.

According to one aspect of the invention, the struts are curved in such a manner that seen in the meridional section a first connecting section of the respective strut on the contour wall extends in the radial direction or predominantly in the radial direction and a second connecting section of the respective strut on the housing extends in the axial direction or predominantly in the axial direction.

Through the curved embodiment of the struts with the connecting section, which seen in the meridional section, extend in different directions an optimal, low-loss flow through the secondary flow chamber is possible. By way of this, the characteristic map stability of the radial compressor can be improved. Furthermore, the structural stability of the radial compressor is improved and the risk of a vibration excitation of the radial compressor reduced.

According to an advantageous further development, seen in the axial section, the first connecting section and the second connecting section of the respective strut are offset relative to one another in the circumferential direction. By way of this, the characteristic map stability, in particular the pump stability, can be further improved. Furthermore, the structural stability of the radial compressor is further improved, in particular the susceptibility to vibration reduced.

According to an advantageous further development, the first connecting section and the second connecting section of the respective strut seen in the axial section are offset relative to one another in the circumferential direction. By way of this, the characteristic map stability, in particular the pump stability, can be further improved. Furthermore, the structural stability of the radial compressor is further improved, in particular the susceptibility to vibration reduced.

According to an advantageous further development, the struts, seen in the axial section, are unevenly distributed in the circumferential direction, namely in such a manner that in a circumferential section, which faces a tongue of the spiral housing, a lower number of struts is formed than on a circumferential section facing away from the tongue of the spiral housing. These features also serve for reducing the susceptibility to vibration and the improvement of the structural stability of the radial compressor.

According to an advantageous further development, angles, which seen in the axial section each include respective adjacent struts have a non-integral divisor to 360°. The structural stability of the radial compressor is further improved, in particular its susceptibility to vibration reduced.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

Figure 1:
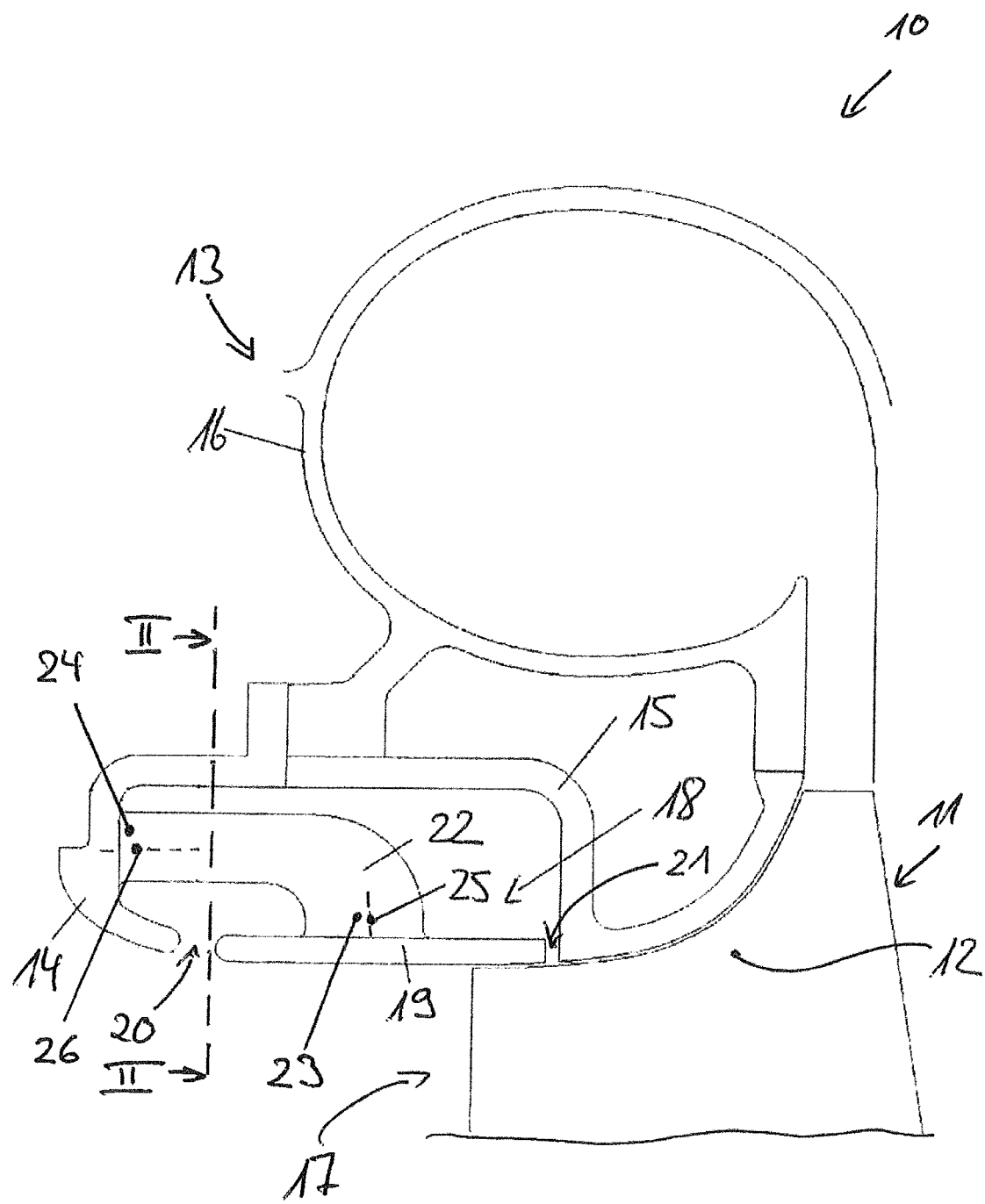
FIG. 1: is a schematised meridional section through a radial compressor according to the invention.
Figure 2:
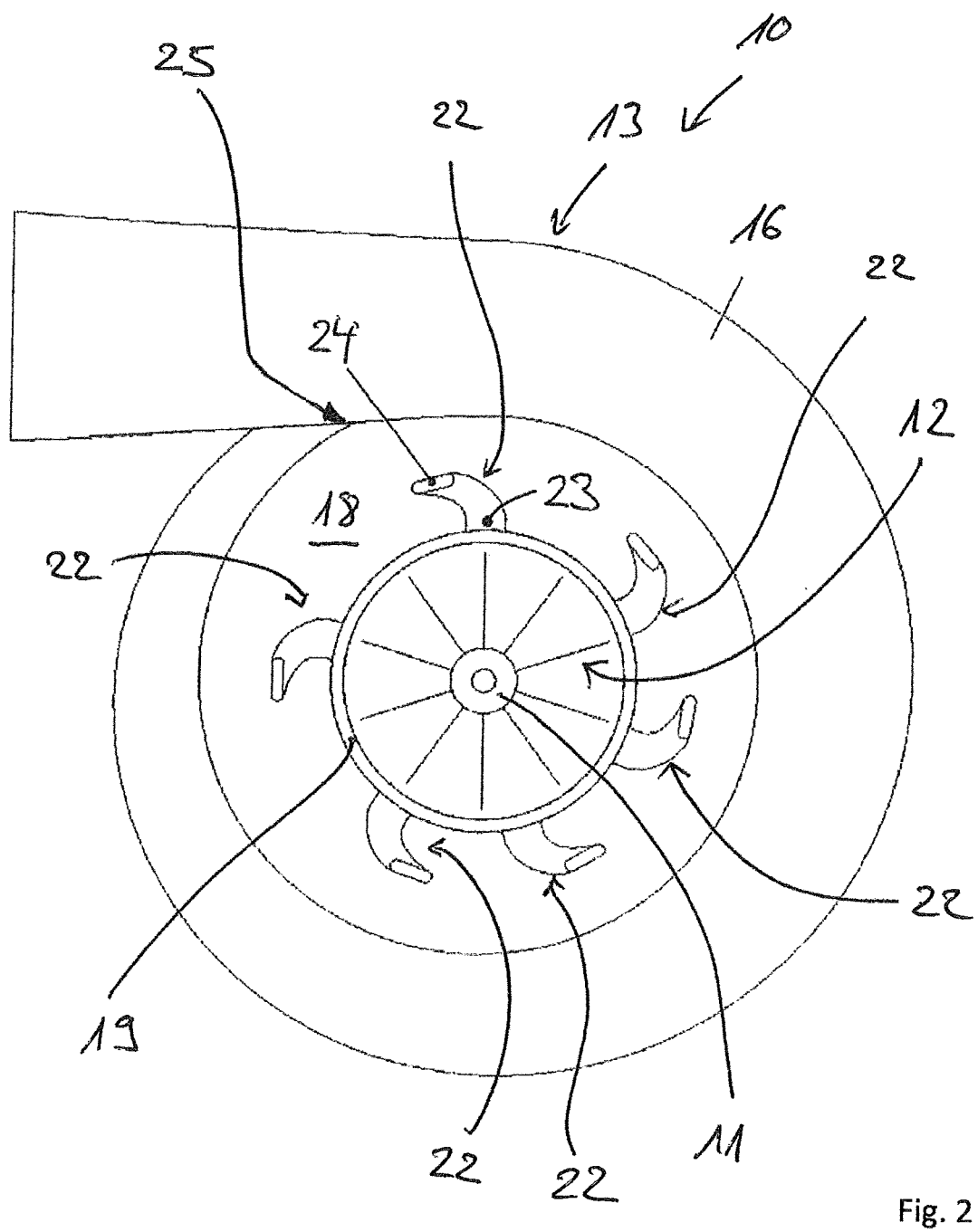
FIG. 2: is a schematised axial section through the radial compressor according to the invention in the section direction II-II of FIG. 1.

FIGS. 1 and 2 show differently schematised cross sections in the form of extracts through a preferred exemplary embodiment of a radial compressor 10 according to one aspect of the invention.

A radial compressor 10 comprises a rotating impeller 11 with multiple moving blades 12. Furthermore, a radial compressor 10 comprises a fixed housing 13. Of the fixed housing 13 a suction section 14 arranged upstream of the rotating impeller 11 seen in the flow direction of a medium to be compressed, an insert piece section 15 positioned in the region of the impeller 11, as well as a spiral housing section 16 arranged downstream of the impeller 11 are shown in FIG. 1, which in the exemplary embodiment of FIG. 1 are formed by separate assemblies.

Accordingly in FIG. 1 the housing 13 is embodied in multiple parts and comprises the separate suction section 14, the separate insert piece section 15, and the separate spiral housing section 16, which are connected to one another.

It is pointed out that in contrast with the shown exemplary embodiment it is possible that the suction section 14 and the insert piece section 15 are formed in one piece and accordingly are provided by a monolithic assembly. It is possible, furthermore, that the spiral housing section 16 is also formed in one piece together with the insert piece section 15 and the suction section 14 and accordingly monolithically.

The housing 13 of the radial compressor 10 defines a main flow passage 17 for a medium to be compressed to conduct, via the main flow passage 17, the medium to be compressed in the direction of the impeller 11. Outside of the main flow passage 17, the housing 13 defines a secondary flow chamber 18. A contour wall 19, which is also referred to as annular web, separates the main flow passage 17 from the secondary flow chamber 18.

The secondary flow chamber 18 extends from a section upstream of the impeller 11 as far as into the region of the impeller 11. Accordingly, FIG. 1 shows that between the suction section 14 of the housing 13 and the contour wall 19 a first secondary flow opening 20 is formed, via which the secondary flow chamber 18, seen in the flow direction of the medium to be compressed, is connected to the main flow passage 17 upstream of the impeller 11. A second secondary flow opening 21 is formed in the region of the impeller 11, via which the secondary flow chamber 18 is connected to the main flow passage 17 in the region of the impeller 11. Within the secondary flow chamber 18 struts 22 extend. By way of the struts 22 the contour wall 19 in the housing 10 is connected, namely in the shown exemplary embodiment to the suction section 14 of the housing 13.

The struts 22 are curved, in such that seen in the meridional section a first connecting section 23 of the struts 22 extends on the contour wall 19 in the radial direction or predominantly in the radial direction, and that a second connecting section 24 of the strut 22 located opposite extends on the housing 10, in the shown exemplary embodiment on the suction section 14, in the axial direction or predominantly in the axial direction, namely in each case seen in the meridional section.

An extension predominantly in the radial direction of the first connecting section 23 of the strut 22 on the contour wall 19 means that a longitudinal center axis 25 of this first connecting section 23 includes with the radial direction an angle of maximally 20°, preferably of maximally 10°, particularly preferably of maximally 5°. An extension of the second connecting sections 24 of the respective strut 22 predominantly in the axial direction means that, seen in the meridional section, a longitudinal center axis 26 of the respective second connecting section 24 of the respective strut 22 includes with the axial direction an angle of 20°, preferably of maximally 10°, particularly preferably of maximally 5°.

Struts 22 curved in this manner, which extend in the secondary flow chamber 18, ensure an unobstructed flow through the secondary flow chamber 18 and thus improve the characteristic map stability, in particular pump stability of the radial compressor. Furthermore, the same improve the structural stability of the radial compressor, so that the same is exposed to a lower vibration excitation and thus lower vibration risk.

Seen in the axial section of FIG. 2, the connecting sections 23 and 24 of each strut 22, i.e. the first connecting section 23 and the second connecting section 24 of the respective strut 22, are offset relative to one another in the circumferential direction. This also serves for the improvement of the characteristic map stability, in particular pump stability, and for the increasing of the structural stability.

Although this offset of the first connecting section 23 and second connecting section 24 in the circumferential direction is preferred it is pointed out that seen in the axial section in the region of each strut 22, the connecting sections 23 and 24 can also be positioned in the same circumferential position.

As is evident from FIG. 2, the struts 22, seen in the axial section, are unevenly distributed in the circumferential direction. Here, the struts 22 seen in the axial section are unevenly distributed in the circumferential direction in such a manner that seen in the axial section in a circumferential section, which faces a tongue 25 of the housing 13, namely a tongue of the spiral housing 16, a lower number of struts 22 is formed than on a circumferential section facing away from the tongue 25. The tongue of the spiral housing section 16 separates an inlet-side flow passage from an outlet-side flow passage of the housing 13. In the exemplary embodiment shown in FIG. 2, two struts are positioned in the circumferential section, which faces the tongue 25, while by contrast four struts 22 are positioned in the circumferential section facing away from the tongue 25. Through this uneven distribution of the struts 22 in the circumferential direction, the structural stability of the radial compressor can be further improved, in particular the susceptibility to vibration of the same reduced.

Through the uneven distribution of the struts 22 in the circumferential direction as seen in the axial section, at least some of the directly adjacent struts 22 include an angle other than other directly adjacent struts 22. It is true in each case that the angles, which seen in the axial section include adjacent struts in each case, have a non-integral divisor to 360°. Accordingly, no angles between directly adjacent struts are formed, of which 360° is an integral multiple. By way of this, the structural stability can also be improved, in particular the risk of a vibration excitation for the radial compressor is reduced.

Accordingly, a radial compressor with improved characteristic map stability and accordingly optimised operating behaviour is provided by the invention. In particular, the pump stability can be increased and the susceptibility to vibration of the radial compressor reduced. The secondary flow chamber can be flowed through in a low-loss manner. The struts 22 are contoured curved, with the connecting sections 23, 24 extending in different directions on the contour wall 19 and on the housing 10, in particular on the suction section 14 of the housing 10.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A radial compressor, of an exhaust gas turbocharger, comprising:
    an impeller configured to rotate;
    a fixed housing;

a main flow passage defined by the housing configured to feed a medium to be compressed in a direction of the impeller;

a contour wall;

a secondary flow chamber arranged radially outside the main flow passage, connected to the main flow passage via a first flow opening, which is separated from the main flow passage by the contour wall and which in a region of the impeller is connected to the main flow passage via a secondary flow opening; and struts that extend in the secondary flow chamber, via which a first connection section of a respective strut is connected to the contour wall and a second connection section of the respective strut is connected to a radially extending portion of the housing whereby the contour wall is connected to the housing;

wherein the struts are curved such that as seen in a meridional section the first connection section of the respective strut on the contour wall extends in a radial direction or predominantly in the radial direction and the second connection section of the respective strut on the housing extends in an axial direction or predominantly in the axial direction.

2. The radial compressor according to claim 1, wherein seen in the meridional section a longitudinal center axis of the first connection section includes with the radial direction an angle of at least one of:

maximally 20°;
maximally 10°; and
maximally 5°.

3. The radial compressor according to claim 2, wherein the angles, which seen in an axial section include respective adjacent struts, have a non-integral divisor to 360°.

4. The radial compressor according to claim 1, wherein seen in the meridional section a longitudinal center axis of the second connection section includes with the axial direction an angle of at least one of maximally 20°;
maximally 10°;
and maximally 5°.

5. The radial compressor according to claim 4, wherein the angles, which seen in the axial section include respective adjacent struts, have a non-integral divisor to 360°.

6. The radial compressor according to claim 1, wherein in an axial section the first connection section and the second connection section of the respective strut are offset relative to one another in a circumferential direction.

7. The radial compressor according to claim 1, wherein in an axial section the struts are unevenly distributed in a circumferential direction, such that in a circumferential section, which faces a tongue of a spiral housing, a lower number of struts is formed than on a circumferential section facing away from the tongue of the spiral housing.

8. The radial compressor according to claim 1, wherein the housing comprises:

a suction section arranged, as seen in a flow direction of the medium to be compressed, upstream of the impeller;

an insert piece section extending in a region of the impeller; and a spiral housing section arranged downstream of the impeller.

9. The radial compressor according to claim 8, wherein at least the spiral housing section is formed as a separate assembly of the housing.

10. The radial compressor according to claim 8, wherein the suction section and the insert piece section are formed as a separate assembly of the housing.

11. The radial compressor according to claim 8, wherein the struts, with their second connecting sections, act on the suction section of the housing.

12. The radial compressor according to claim 1, wherein the second connection section of the respective strut that extends in the axial direction or predominantly in the axial direction connects to the housing upstream of the first flow opening.

13. The radial compressor according to claim 1, wherein the second connection section of the respective strut that extends in the axial direction or predominantly in the axial direction connects to the housing at least in part at a suction section.

* * * * *